Figure 1:
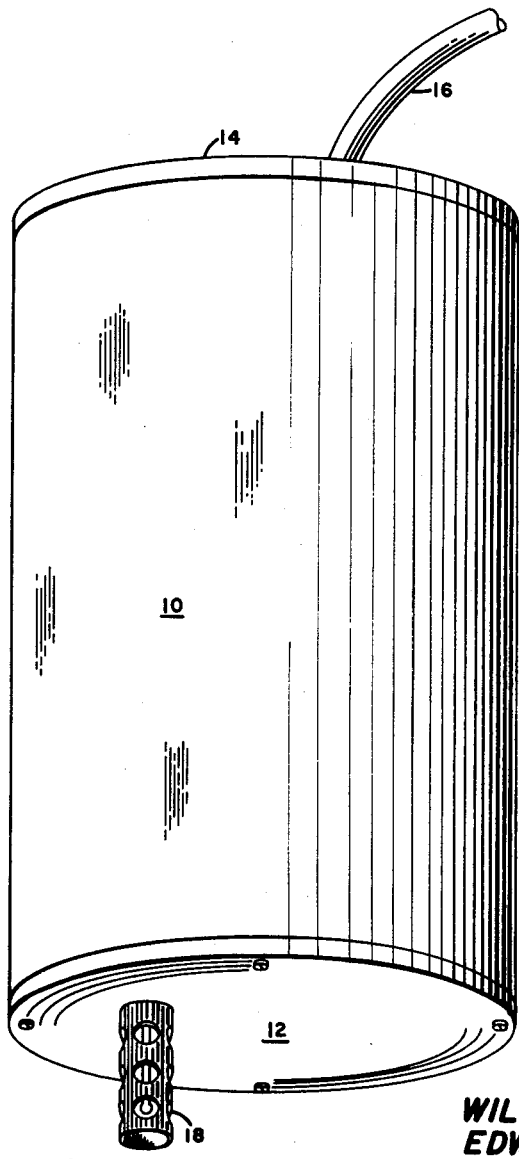

Jan. 12, 1965 W. J. LEISS ETAL 3,165,715
HIGH PRESSURE SEAL MOUNTING FOR BRITTLE INSTRUMENT
Filed Nov. 23, 1962 2 Sheets-Sheet 1

FIG. I

WILLIAM J. LEISS
EDWARD J. J. TRACEY, Jr.
RICHARD F. TRUFANT
INVENTOR.

BY

ATTORNEY

Jan. 12, 1965 W. J. LEISS ETAL 3,165,715
HIGH PRESSURE SEAL MOUNTING FOR BRITTLE INSTRUMENT
Filed Nov. 23, 1962 2 Sheets-Sheet 2

WILLIAM J. LEISS
EDWARD J.J. TRACEY, Jr.
RICHARD F. TRUFANT
INVENTOR.

BY

*/C. Muller/*
ATTORNEY

United States Patent Office 3,165,715
Patented Jan. 12, 1965

3,165,715
HIGH PRESSURE SEAL MOUNTING FOR BRITTLE INSTRUMENT
William J. Leiss, Richard F. Trufant, and Edward J. J. Tracey, State College, Pa., assignors, by mesne assignments, to the United States of America as represented by the Secretary of the Navy
Filed Nov. 23, 1962, Ser. No. 239,852
8 Claims. (Cl. 338—228)

This invention relates to high-pressure sealing devices and more particularly to such devices for sealing, mounting, and potting delicate and brittle shafts while protecting them from shock and vibration.

Specific mention is made herein to a thermistor since this invention was originally developed because of the difficulty of commercial equipment in holding a watertight seal in conjunction with thermistors at depths in the ocean of 6000 feet. The thermistor is an electrical device used to measure temperature and is usually enclosed in a brittle glass tube of varying diameter. To measure the water temperature of the ocean at various depths, a thermistor is lowered to the depth required and electrically indicates the temperature. The device will not function, however, if the seawater leaks through its mounting and contacts the electrical leads at its rear. Although the thermistor is referred to it is to be understood that the invention may be used to mount and seal numerous shaft-like objects.

Particular difficulty is encountered in sealing a brittle shaft extending from a region of extremely high pressure to that of low-pressure. Pressure frequently pushes the shaft into the low-pressure region. Extreme force cannot be used in sealing the shaft because of the danger of breaking it. Likewise, the seal must be shock proof to prevent the shaft from fracturing when the instrument is struck or bumped.

Basically, the concept of invention and the illustrative device herein shown involves a technique for forming a high-pressure seal between two regions at considerably different pressure, around a brittle shaft traversing these regions. The shaft is potted to reduce shock and to hold it fast, thereby eliminating slipping through the seal from the high-pressure region to the low-pressure region. The unique ability of this invention to develop a leakproof and shock-resistant sealing is achieved by having a soft material in intimate contact with the shaft to be sealed at the high-pressure region, an intermediate flexible material in contact at the mid-portion of the shaft, and relatively hard supporting and sealing substance shaft at the low-pressure region.

An object of this invention is to provide a novel means and technique for forming a leak-proof high-pressure seal and shock reducing combination between two regions at considerably different pressures.

Another object is to use potting compounds to surround an element traversing two differing pressure regions, thus providing a shock reducing effect, a sealing means, and a firm mounting base for the element.

Yet another object is to provide a rigid resin used on the low-pressure side of a seal to maintain elements in place and a resilient potting compound on the other side to provide sealing capabilities, flexibility and shock reduction.

A further object of this invention is to provide a preset flexible seal to effectively seal irregularly shaped elements to withstand high pressure. Still another object is to use certain rubber-like materials to form a novel three-way seal, shock reducing and potting combination capable of effective sealing of high pressures while plunging delicate instruments into ocean depths.

Other objects and many of the attendant advantages of this invention will be readily appreciated as the same becomes better understood by reference to the following detailed description when considered in connection with the accompanying drawings, FIGURE 1 is an elevational view of the housing upon which an embodiment of this invention is located.

Figure 2:
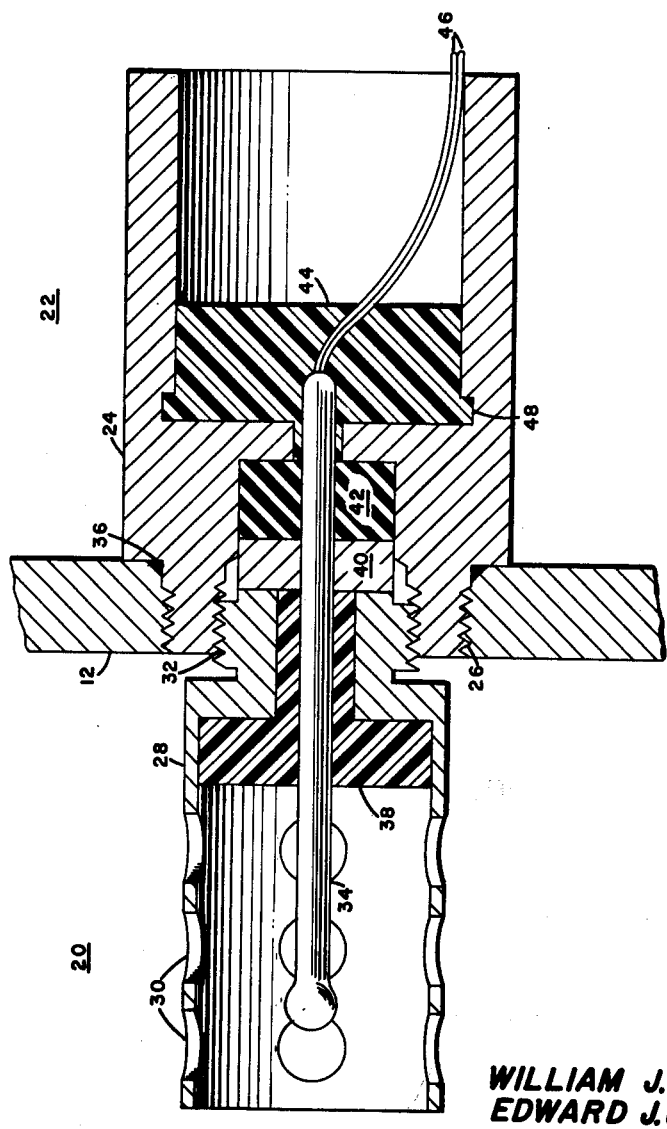

FIGURE 2 is a vertical cross sectional view with parts in elevation of an embodiment of the invention mounted upon the housings of FIGURE 1.

Referring now to the drawings, and in particular FIGURE 1, there is shown water-tight cylindrical housing 10 having front plate 12 and rear plate 14, with cable 16 extending therefrom. An embodiment 18 of this invention is attached and extends through front plate 12.

Referring now to FIGURE 2, there is shown a portion of front plate 12 of the housing 10 through which the embodiment 18 of this invention extends having a high-pressure region 20 on its left portion and a low-pressure region 22 on its right portion. Hollow rear casing 24 extends through front plate 12 and is secured thereto by means of threads 26. Hollow front casing 28, having holes 30 is screwed into rear casing 24 by means of threads 32 while thermistor 34 extends through front casing 28, front plate 12, and rear casing 24. O-ring 36 positioned between front plate 12 and casing 24 acts as a seal to prevent seepage of sea water from high-pressure region 20 to low-pressure region 22.

Thermistor 34 extends through soft seal 38, contained within casing 28, washer 40, and plastic washer 42, positioned within casing 24 to hard seal 44 also within casing 24. Hard seal 44 surrounds the rear portion of thermistor 34 and encases wires 46. Casing 28 may be screwed within casing 24 to cause washer 40 to bear against plastic washer 42 compressing it against thermistor 34 and against the internal surface of casing 24 to produce a sealing effect. The washer 40 further locks the front casing 28 within rear casing 24 by providing back pressure against threads 32 of the front casing 28.

Soft seal 38 is comprised of a soft rubber-like material which is poured into the internal portion of casing 28 while in a liquid state. There it hardens about thermistor 34, adhering very closely to its surface and to the internal surface of casing 28. Soft seal 38 may be comprised of silicone rubber, polysulfide, polyurethane, soft plastic, or other materials which will lend themselves to melting and pouring. Hard seal 44 is comprised of a rigid material likewise is poured molten into casing 24 so as to surround the rear portion of thermistor 34 and wires 46 extending therefrom. Hard seal 44 is locked within casing 24 by means of groove 48 in the internal diameter of housing 24. Wires 46 are connected to measuring instruments (not shown) contained within housing 10. Hard seal 44 may be comprised of a rigid material which can be poured, for example; epoxy resins, hard waxes, plaster, ceramics, or the like. Hard seal 44 thus acts as a support means to prevent thermistor 34 from being pushed into housing 10 by the high-pressure sea water in region 20. It should be noted that soft seal 38 and hard seal 44 when poured into place, blend themselves well to sealing irregular shafts in that all irregularities are filled. Plastic washer 42 is made of a plastic water sealing material of medium hardening capable of being deformed under pressure. Rubber or rubber-like compounds are used.

In operation housing 10, containing the described embodiment 18 of this invention, is lowered to a depth into sea water. Soft seal 38 is forced by the water pressure into intimate contact with the thermistor shaft 34 and the internal portion of casing 28, thus providing a sealing means and shock resistant cushion. Plastic washer 42, being forced into intimate contact with thermistor 34 and with the internal portion of casing 24 by screwing casing 28 as previously described, provides a sealing means. Hard seal 44 provides a support for thermistor 34 preventing it from being forced into low-pressure region 22 by the sea water pressure. It is locked into position by groove 48. Thus electrical potential of thermistor 34 is transmitted by wires 46 to instruments (not shown) within housing 10 and from there through cable 16 to the water surface where the temperature is recorded.

As may be readily seen, thermistor 34 is sealed and supported by an effective three-way combination. Soft seal 38 serving as a shock reducer and seal, plastic washer 42 as an intermediate seal, and supporting hard seal 44 as both seal and supporting means for the thermistor 34. This combination has proven satisfactory for use in great depths of sea water.

Let it be noted and understood that the representations herein are given by way of example and although such specifics as thermistors are mentioned, any shaft, hollow or solid, and of any shape may be used; as well as any combinations of housings and casings. These are within the scope and spirit of this invention which is further defined in the following claims.

We claim:

1. In the sealing of a brittle ceramic thermistor for submergence into the ocean to determine temperatures at various depths, the combination comprising: a rubber-like potting means surrounding said thermistor to eliminate shock and vibration on said thermistor; a sealing means of rubbery substance compressed around said thermistor adjacent to said potting means; a hard electrical insulating supporting means behind said thermistor whereby said thermistor cannot be forced rearward by the pressure of said ocean depths; and a housing covering, and in intimate contact with, said shock and vibration eliminating means, said sealing means, and said supporting means holding each in intimate contact with said thermistor.

2. In the high pressure sealing of a brittle thermistor for submergence in the ocean, the combination comprising:
    an outer housing exposed to ocean water;
    an inner housing screwably attached to said outer housing;
    a thermistor extending through said outer and said inner housing;
    a soft supporting material in surrounding contact with said thermistor and contained within said outer housing;
    a flexible seal in surrounding contact with said thermistor in said inner housing, said flexible seals being compressible about said thermistor by screwing said outer housing within said inner housing;
    a hard supporting material surrounding the end portion of said thermistor within said inner housing whereby said thermistor axial movement is eliminated.

3. A sealing device adapted to seal a brittle shaft extending from a region of high pressure sea water to a region of low pressure, comprising in combination:
    a housing member having a bore extending therethrough from a region of high pressure sea water to a region of low pressure, the section of said bore in said region of low pressure having an annular groove positioned therein;
    a brittle shaft positioned within said bore extending from said region of high pressure to said region of low pressure;
    a rigid support seal in said region of said bore of low pressure, containing the entire end portion of said brittle shaft within said region, said support member contained within said annular groove whereby said brittle shaft is prevented from axial movement toward said low pressure region;
    a flexible sealing member adjacent to said support member and surrounding said shaft, said sealing member being compressed about said shaft;
    a shock absorbing means adjacent to said sealing member and surrounding said shaft in said region of high pressure, adapted to seal and reduce shock upon said shaft.

4. The combination as claimed in claim 3 in which said brittle shaft comprises a thermistor having electrical conductors extending therefrom to said low pressure region.

5. The combination as claimed in claim 4 in which said shock absorbing means is comprised of a soft pourable rubber.

6. The combination as claimed in claim 5 in which said rigid support seal is comprised of an epoxy resin.

7. In the sealing of a fragile shaft which extends through a wall separating a region of low pressure from a region of high pressure wherein said shaft terminates and has axial forces bearing thereon, the combination comprising:
    a wall having therethrough a passage containing a threaded portion on the higher pressure side, a shoulder adjacent to the base of said threaded portion, a somewhat larger diameter bore behind said shoulder toward the lower pressure region and an annular groove in said bore;
    a cylindrical member having one end screwed into said passage and formed with a surface which co-operates with said shoulder;
    a deformable washer compressed between said shoulder and said co-operating surface and having a passage therethrough containing said fragile shaft;
    a hardenable substance having a high shear strength property, contained within said bore, surrounding said shaft and in intimate contact with said groove, said substance extending somewhat beyond the terminal portion of said shaft.

8. The combination as claimed in claim 7 in conjunction with a soft rubber-like substance surrounding a portion of said shaft but not completely covering the exposed terminal portion of said shaft whereby said shaft is protected against damage due to impact and vibration.

References Cited by the Examiner

UNITED STATES PATENTS

| | | | |
|---|---|---|---|
| 2,361,215 | 10/44 | Lamberger et al. | 174—152 |
| 2,651,672 | 9/53 | Ivanoff | 174—31 X |
| 2,838,596 | 6/58 | Foord | 174—70 X |
| 2,840,262 | 6/58 | Learmonth et al. | |
| 2,894,055 | 7/59 | Clarke et al. | 174—152 X |
| 2,987,570 | 6/61 | Bluth | 174—77 |

JOHN F. BURNS, *Primary Examiner.*

JOHN P. WILDMAN, *Examiner.*